(12) United States Patent
Ohara

(10) Patent No.: US 10,773,553 B2
(45) Date of Patent: Sep. 15, 2020

(54) PNEUMATIC TIRE

(71) Applicant: Toyo Tire & Rubber Co., Ltd., Itami-Shi, Hyogo (JP)

(72) Inventor: Masaaki Ohara, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 415 days.

(21) Appl. No.: 15/657,957

(22) Filed: Jul. 24, 2017

(65) Prior Publication Data

US 2018/0043735 A1    Feb. 15, 2018

(30) Foreign Application Priority Data

Aug. 9, 2016    (JP) .................................. 2016-156434

(51) Int. Cl.
| | | |
|---|---|---|
| *B60C 11/00* | (2006.01) | |
| *B60C 9/18* | (2006.01) | |
| *B60C 9/30* | (2006.01) | |
| *B60C 9/17* | (2006.01) | |
| *B60C 9/02* | (2006.01) | |

(52) U.S. Cl.
CPC .................. *B60C 9/17* (2013.01); *B60C 9/30* (2013.01); *B60C 2009/0284* (2013.01); *B60C 2011/0033* (2013.01)

(58) Field of Classification Search
CPC . B60C 3/06; B60C 2011/0033; B60C 9/0292; B60C 9/17; B60C 5/12; B29D 2030/0665; B29D 2030/0634; B29D 2030/0635; B29D 2030/0637; B29D 2030/0638; B29D 2030/0639; B29D 2030/0641; B29D 2030/0642

USPC .................................................. 152/454–456
See application file for complete search history.

(56) References Cited

U.S. PATENT DOCUMENTS

| | | | | |
|---|---|---|---|---|
| 4,819,704 A | * | 4/1989 | Misawa ................. | B60C 19/001 152/209.1 |
| 4,848,429 A | * | 7/1989 | Mezzanotte ............ | B60C 11/00 152/209.5 |
| 5,355,925 A | * | 10/1994 | Katsura ..................... | B60C 9/30 152/455 |

FOREIGN PATENT DOCUMENTS

| | | | | |
|---|---|---|---|---|
| DE | 102005019203 A1 | * | 5/2006 | ........... B60C 19/002 |
| EP | 0200179 A2 | | 11/1986 | |
| JP | S61-275008 A | | 12/1986 | |
| JP | H02-185803 A | | 7/1990 | |
| JP | 4-193606 A | | 7/1992 | |
| JP | 5-178008 A | | 7/1993 | |
| JP | 07156609 A | * | 6/1995 | ........... B60C 9/2006 |
| JP | H08-258512 A | | 10/1996 | |

(Continued)

OTHER PUBLICATIONS

Machine Translation: JP-2011235812-A; Kamitoku, Koichi; (Year: 2019).*

(Continued)

*Primary Examiner* — Kendra Ly
(74) *Attorney, Agent, or Firm* — Westerman, Hattori, Daniels & Adrian, LLP

(57) ABSTRACT

To provide a pneumatic tire with which a magnitude of a lateral force can be adjusted without changing the structure of a tread portion. In a pneumatic tire, an outer profile shape of the pneumatic tire is formed in left and right symmetry with respect to a tire equator, and a thickness of the pneumatic tire from an outer surface to an inner surface is set in left and right asymmetry with respect to the tire equator.

8 Claims, 3 Drawing Sheets

(56) References Cited

FOREIGN PATENT DOCUMENTS

| JP | 2010-202126 A | | 9/2010 |
|---|---|---|---|
| JP | 2010202126 A | * | 9/2010 |
| JP | 2011-235812 A | | 11/2011 |
| JP | 2011235812 A | * | 11/2011 |

OTHER PUBLICATIONS

Machine Translation: DE-102005019203-A1; Felsen Hans-Juergen; (Year: 2020).*
Machine Translation: JP-07156609-A; Drosg, Wolfgang; (Year: 2020).*
Machine Translation: JP-2010202126-A; Suzuki, Iwao; (Year: 2020).*
Office Action dated Feb. 1, 2019, issued in counterpart Chinese Application No. 201710178153.9, with English translation (5 pages).
Office Action dated Jul. 4, 2019, issued in counterpart CN Application No. 201710178153.9, with English translation (16 pages).
Office Action dated Jul. 21, 2020, issued in counterpart JP Application No. 2016-156434, with abridged English Translation. (9 pages).

* cited by examiner

PNEUMATIC TIRE

CROSS-REFERENCE TO RELATED APPLICATION

This application is based upon and claims the benefit of priority from Japanese Patent Application No. 2016-156434 (Application date: Aug. 9, 2016); the entire contents of which are incorporated herein by reference.

BACKGROUND OF THE INVENTION

1. Field of the Invention

The present invention relates to a pneumatic tire.

2. Description of the Related Art

It has been known that a lateral force is generated in a pneumatic tire attributed to the internal structure of the pneumatic tire or a design (tread pattern) applied to the pneumatic tire. When such a lateral force is generated, a vehicle on which pneumatic tires are mounted slides sideward. In view of the above, conventionally, an attempt has been made to eliminate such a lateral force. JP-A-4-193606 (patent literature 1) discloses a pneumatic tire where an inclined surface is formed on ribs or blocks of a tread portion so as to cancel a lateral force. JP-A-5-178008 (patent literature 2) discloses a pneumatic tire where lateral grooves which differ from each other in inclination direction are alternately arranged in a tire circumferential direction so as to cancel a lateral force generated by the lateral grooves disposed adjacently to each other.

SUMMARY OF THE INVENTION

However, when the structure of the tread portion is changed as described in patent literature 1 and patent literature 2, although a lateral force can be canceled out, performances which the pneumatic tire is required to possess originally are sacrificed.

There may be also a case where the generation of a lateral force of a predetermined magnitude is desirable rather than eliminating a lateral force.

The present invention has been made in view of such circumstances, and it is an object of the present invention to provide a pneumatic tire with which a magnitude of a lateral force can be adjusted without changing the structure of a tread portion.

According to an aspect of the present invention, there is provided a pneumatic tire configured such that an outer profile shape of the pneumatic tire is formed in left and right symmetry with respect to a tire equator, and a thickness of the pneumatic tire from an outer surface to an inner surface is set in left and right asymmetry with respect to the tire equator.

According to another aspect of the present invention, there is provided a pneumatic tire including one, two or more belts, wherein the belt disposed on an outermost layer out of the belts which cover a width equal to or more than a half of a ground contact width is offset with respect to a tire equator.

In the pneumatic tire according to the present invention, a lateral force is generated by setting the thickness of the pneumatic tire from the outer surface to the inner surface in a left right asymmetrical manner or by offsetting the belt disposed on the outermost layer out of the belts which cover the width equal to or more than a half of the ground contact width with respect to the tire equator and hence, it is possible to adjust a magnitude of a lateral force without changing the structure of the tread portion.

DESCRIPTION OF THE PREFERRED EMBODIMENTS

Figure 1:
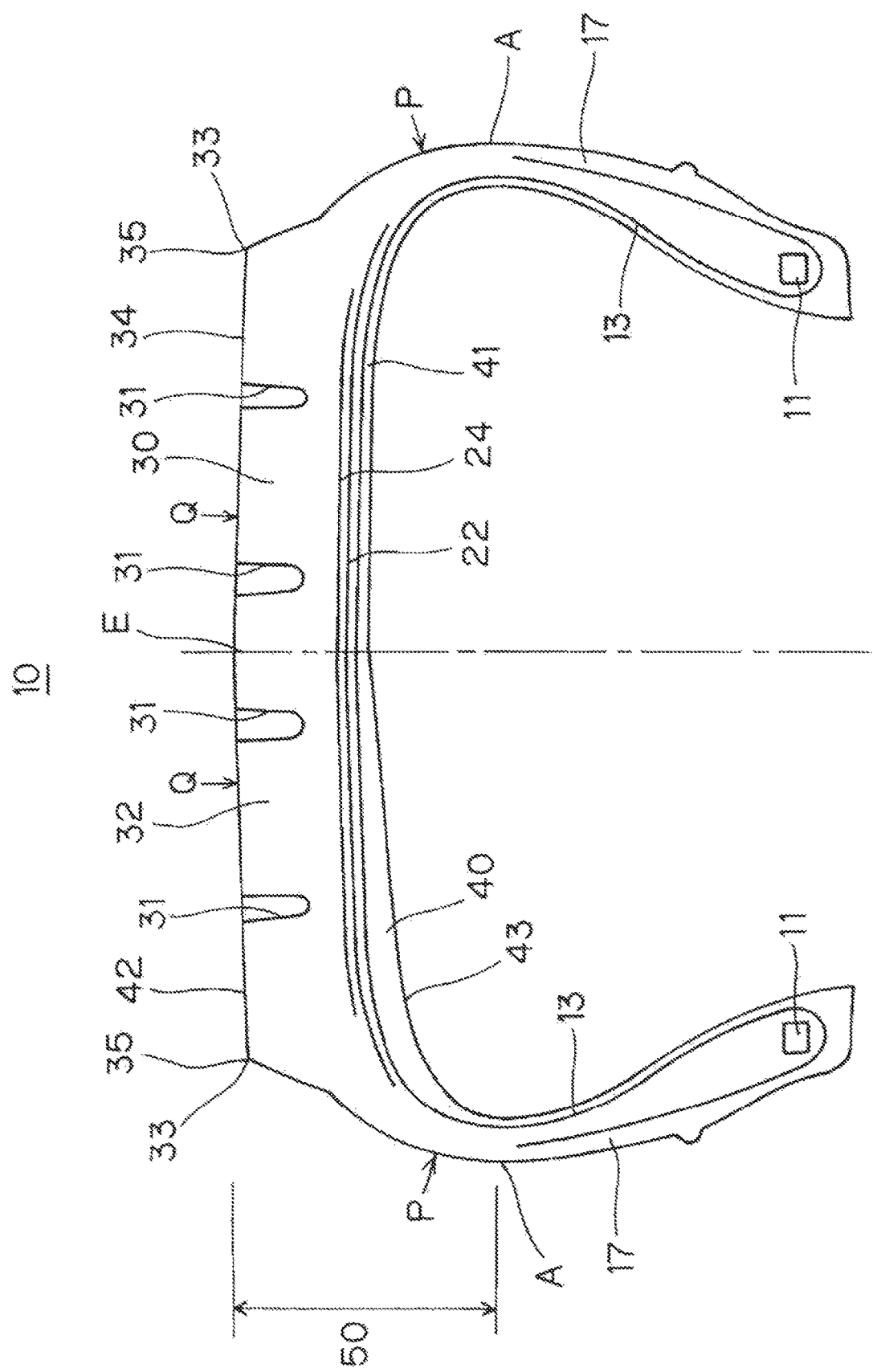
FIG. 1 is a width-direction cross-sectional view of a pneumatic tire 10 according to an embodiment 1 of the present invention.

Embodiments are described with reference to drawings. The embodiments described hereinafter are merely examples, and the scope of the invention is not limited to these embodiments. Further, for the sake of description, there may be a case where lengths, shapes and the like of constitutional elements are exaggerated in the drawings. Left and right sides used in the description hereinafter agree with left and right sides in the drawings.

1. Embodiment 1

(1) Basic Structure of Pneumatic Tire 10

FIG. 1 shows a pneumatic tire 10 of this embodiment. The pneumatic tire 10 of this embodiment includes bead portions on both sides of the pneumatic tire 10 in the tire width direction. The bead portion includes a bead core 11 which is formed by covering bundled steel wires by rubber. A carcass 13 surrounds the bead portions on both sides of the pneumatic tire 10 in the tire width direction, and forms a framework of the pneumatic tire 10 between these bead portions. The carcass 13 is formed such that a plurality of ply cords are covered by rubber. As a ply cord, an organic fiber cord made of polyester, nylon or the like, a steel cord or the like is used.

A belt layer which is formed of a plurality of belts stacked to each other is disposed outside the carcass 13 in the tire radial direction. Each belt is formed such that a plurality of cords made of steel are disposed in an inclined manner with respect to the tire circumferential direction, and the cords are covered by rubber. These belts fasten the carcass 13 thus enhancing rigidity of a tread portion 32.

Figure 2:
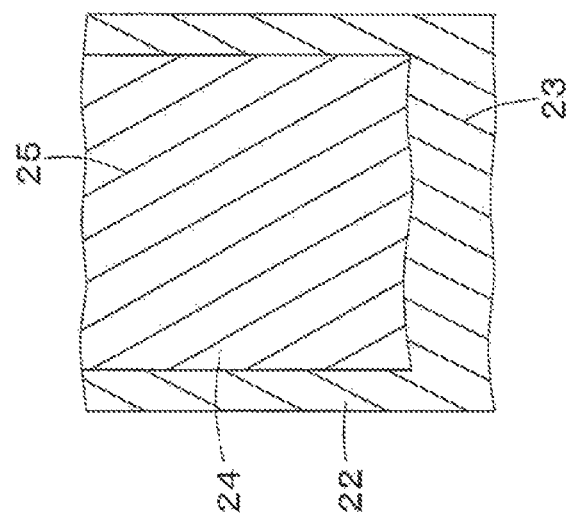
FIG. 2 is a view of a belt layer of the pneumatic tire 10 of the embodiment 1 as viewed from the outside in a tire radial direction.

The number of belts is not limited. For example, in FIG. 1 and FIG. 2, two belts consisting of: a first belt 22 which is disposed on an inner side in the tire radial direction and; a second belt 24 which is disposed on an outer side in the tire radial direction are stacked to each other. The first belt 22 and the second belt 24 respectively have a width at least equal to or more than a half of a ground contact width. For example, the first belt 22 and the second belt 24 respectively have a width substantially equal to a ground contact width which will be described later. The inclination direction of cords 23 in the first belt 22 and the inclination direction of cords 25 in the second belt 24 are opposite to each other. A belt having a width equal to or less than a half of the ground contact width may be disposed outside these belts in the tire radial direction.

A belt reinforcing layer may be disposed outside the plurality of belts in the tire radial direction. The belt reinforcing layer covers the plurality of belts as a whole from the outside in the tire radial direction. The belt reinforcing layer is formed such that a plurality of cords extending substantially parallel to the tire circumferential direction are covered by rubber. The cords of the belt reinforcing layer are made of organic fibers such as nylon or polyester. The belt reinforcing layer suppresses the deformation of the pneumatic tire caused by a centrifugal force generated during traveling of a vehicle.

Figure 3:
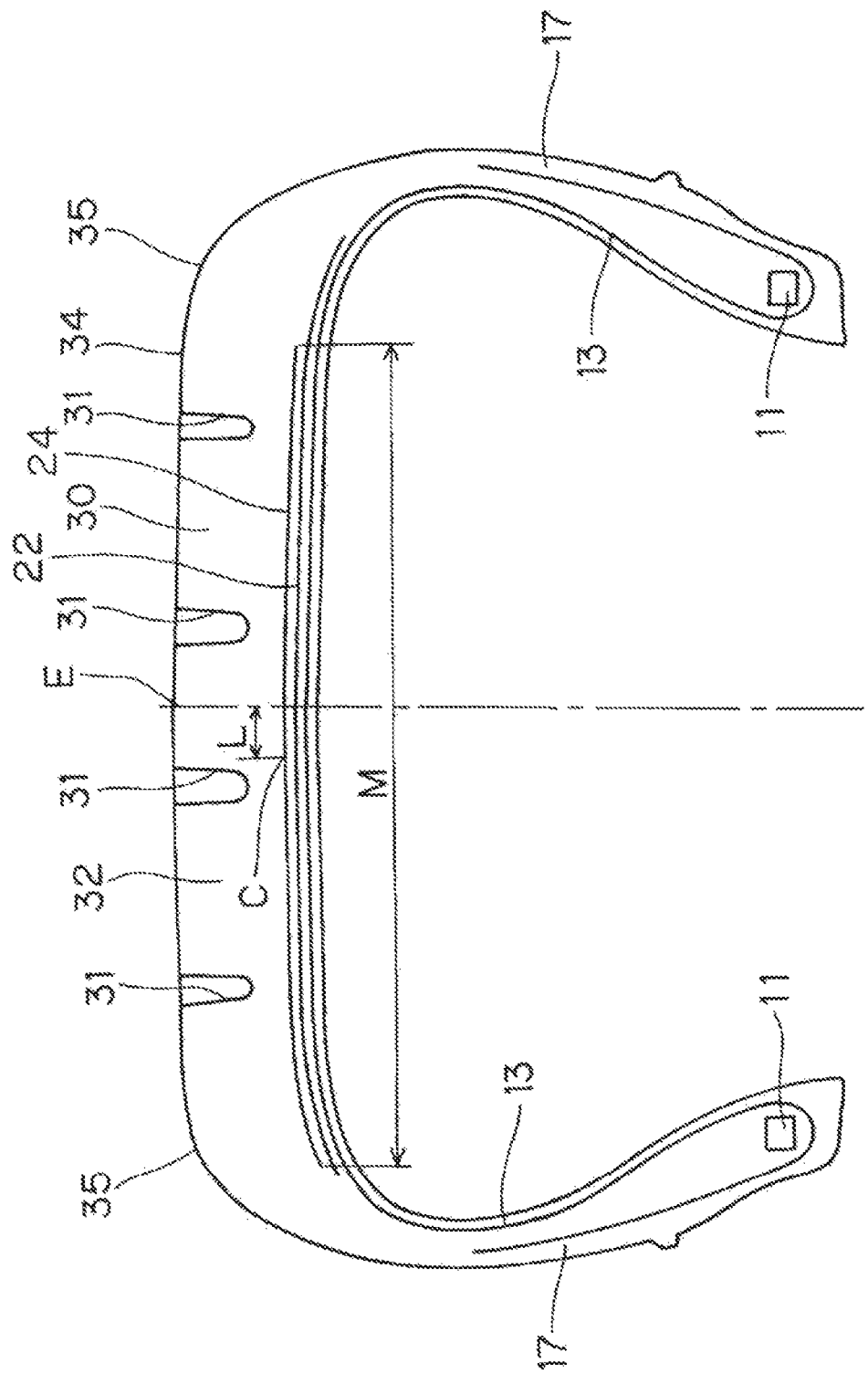
FIG. 3 is a width-direction cross-sectional view of a pneumatic tire 110 according to an embodiment 2 of the present invention.

A tread rubber 30 is disposed outside the belt layer and the belt reinforcing layer in the tire radial direction. A design (tread pattern) is applied to the tread rubber 30. The design is formed of: main grooves 31 extending in the tire circumferential direction; lateral grooves extending in the tire width direction or in the direction inclined with respect to the tire width direction and the like. A portion of the tread rubber 30 to which such a design is applied forms a tread portion 32. The tread portion 32 has a ground contact surface 34. The ground contact surface 34 means a ground contact surface in a state where the pneumatic tire 10 is assembled to a normal rim, an internal pressure of the pneumatic tire 10 is set to a normal internal pressure, and a normal load is applied to the pneumatic tire 10. In this embodiment, the normal rim means a standard rim prescribed by the standard such as the JATMA standard, the TRA standard or the ETRTO standard. The normal load means a maximum load prescribed in the standard. The normal internal pressure means an internal pressure which corresponds to the maximum load. A width of the ground contact surface 34 is referred to as a ground contact width. Both ends of the ground contact surface 34 in the width direction form ground contact edges 35. In FIG. 1, the ground contact edges 35 form angular corner portions 33. However, as shown in FIG. 3, the ground contact edges 35 may have a curved surface having a radius of curvature instead of an angular corner portion.

Side wall rubbers 17 are disposed on both sides of the carcass 13 in the tire width direction respectively. Besides the above-mentioned members, the pneumatic tire 10 further includes a plurality of other members when necessary in view of functions of the pneumatic tire 10.

In the pneumatic tire 10, a lateral force attributed to the internal structure and referred to as ply steer and a lateral force attributed to the design of the tread portion 32 and referred to as a pattern steer are generated. The ply steer is influenced by, for example, the inclination direction of cords 25 in the belt disposed on an outermost layer out of the belts which cover a width equal to or more than a half of the ground contact width, that is, the second belt 24 in this embodiment. The pattern steer is influenced by the inclination direction of the lateral grooves, for example. A combined lateral force produced by combining the ply steer and the pattern steer to each other is generated in the pneumatic tire 10.

(2) Outer Profile Shape and Thickness of Pneumatic Tire 10

In this embodiment, an outer profile shape of the pneumatic tire 10 is in left and right symmetry with respect to a tire equator E. The outer profile shape means a surface shape of the tread portion 32 in a state where the pneumatic tire 10 is assembled to a normal rim, and an internal pressure of the pneumatic tire 10 is set to a normal internal pressure and thereafter is set to 30 kPa by releasing a pressure in the pneumatic tire 10.

On the other hand, a thickness of the pneumatic tire 10 is in left and right asymmetry with respect to the tire equator E at least within a range where the tread portion 32 is formed. For example, in FIG. 1, inside the carcass 13 in the tire radial direction, a rubber portion 40 which is disposed on a left side with respect to the tire equator E has a larger thickness than a rubber portion 41 which is disposed on a right side with respect to the tire equator E. With such a configuration, the thickness of the pneumatic tire 10 is set in left and right asymmetry.

In this embodiment, a thickness of the pneumatic tire 10 means a length from a tire outer surface 42 to a tire inner surface 43 in the normal direction with respect to the tire outer surface 42. However, in the case shown in FIG. 1 where the tread portion 32 has the angular corner portions 33 at the ground contact edges 35 or in the vicinity of the ground contact edges 35, a shortest length from the angular corner portion 33 to the tire inner surface 43 becomes a thickness of the pneumatic tire 10 at the angular corner portion 33. Hereinafter, the thickness of the pneumatic tire 10 is referred to as "tire thickness".

A degree of setting the tire thickness in left and right asymmetry changes for each tire depending on whether or not a lateral force is to be generated in the pneumatic tire 10, a magnitude of a lateral force to be generated or the like.

Assume a difference between tire thicknesses at two positions which are away from the tire equator E in the leftward and rightward directions respectively by an equal distance as "difference between tire thicknesses at the left and right sides". Based on such assumption, a difference between tire thicknesses at the left and right sides may have at least any one of the following first to third thickness configurations.

The first thickness configuration is such that, within a range sandwiched by the ground contact edges 35 disposed on both sides in the tire width direction, that is, within a range where the ground contact surface 34 is formed, a difference between tire thicknesses at the left and right sides is larger on a ground contact edge 35 side than on a tire equator E side. In other words, within a range sandwiched by the ground contact edges 35 disposed on both sides in the tire width direction, the remoter the positions in the left and right directions from the tire equator E, the larger a difference between tire thicknesses at the left and right sides becomes.

Before the description of the second thickness configuration, assume a portion of the pneumatic tire 10 disposed outside in the tire radial direction from a line which connects two points, that is, left and right points A, A and where the pneumatic tire 10 takes a tire maximum width as "tire radial outside portion 50". Also assume a position in the tire radial outside portion 50 where the tire thickness on the right side of the tire equator E becomes maximum as "maximum thickness position" on the right side, and a position in the tire radial outside portion 50 where the tire thickness on the left side of the tire equator E becomes maximum as "maximum thickness position" on the left side. The second thickness configuration is also provided on the premise that, in the tire radial outside portion 50, the maximum thickness position on the right side and the maximum thickness position on the left side are respectively away from the tire equator E by an equal distance. The second thickness configuration is such that, under such a premise, in the tire radial outside portion 50, a difference between the tire thicknesses at the left and right sides becomes maximum between the maximum thickness position on the right side and the maximum thickness position on the left side.

For example, in FIG. 1, the tire thickness becomes maximum at the position of the ground contact edge 35 on the right side of the tire equator E, and the tire thickness becomes maximum at the position of the ground contact edge 35 also on the left side of the tire equator E, and the left and right ground contact edges 35 are respectively away from the tire equator E by an equal distance. In this case, a difference between tire thicknesses at the ground contact edges 35 disposed on both left and right sides is larger than a difference between tire thicknesses at other positions (at positions P or at positions Q shown in FIG. 1, for example) disposed on the left and right sides respectively.

The third thickness configuration is as follows. In the whole tire radial outside portion 50, a position where the tire radial outside portion 50 has a maximum tire thickness (referred to as "radially-outside maximum thickness position") exists on either the right side or the left side of the tire equator E. A difference between tire thicknesses at the left and right sides becomes maximum between the tire thickness at the radially-outside maximum thickness position and the tire thickness at a position which is in left and right symmetry with the radially-outside maximum thickness position with respect to the tire equator E.

In the first to third thickness configurations, it is desirable that a maximum value of a difference between tire thicknesses at the left and right sides be 2% or more and 7% or less of a maximum thickness of the tire radial outside portion 50. In this specification, "maximum thickness" means the larger tire thickness out of the tire thickness at the maximum thickness position on the right side and the tire thickness at the maximum thickness position on the left side.

(3) Method for Manufacturing Pneumatic Tire 10

A shape of the pneumatic tire 10 where an outer profile shape is symmetrical with respect to the tire equator E and a tire thickness is asymmetrical with respect to the tire equator E can be formed at the time of vulcanization molding, for example.

A vulcanization molding apparatus includes: a die which has sectors, side plates and bead rings and into which an unvulcanized tire can be inserted in a lying-down posture; and a bladder which is inflated on an inner surface side of the inserted unvulcanized tire. To bring the outer profile shape of the pneumatic tire after vulcanization molding into a symmetrical shape with respect to the tire equator E, a shape of a tire molding surface of the die is formed in a symmetrical shape with respect to a center plane of the die (a plane which horizontally passes an intermediate position between the upper and lower side plates).

Assume that the bladder is inflated in a vertically asymmetrical manner in such a vulcanization molding apparatus, for example. When an unvulcanized tire is formed by vulcanization molding using the vulcanization molding apparatus, after vulcanization molding, the outer profile shape of the pneumatic tire 10 after vulcanization molding becomes symmetrical with respect to the tire equator E. On the other hand, since the bladder is inflated in a vertically asymmetrical manner, after vulcanization molding, a shape of an inner surface 43 of the pneumatic tire 10 becomes asymmetrical with respect to the tire equator E. As a result, a tire thickness of the pneumatic tire 10 after vulcanization molding becomes asymmetrical with respect to the tire equator E.

Also assume that, for example, in the above-mentioned vulcanization molding apparatus, the bladder is inflated in a vertically symmetrical manner, and a center plane of the bladder (a plane which horizontally passes an intermediate position between an upper end portion and a lower end portion of the inflated bladder in a horizontal manner) is offset in either the upward direction or the downward direction with respect to the center plane of the die. When an unvulcanized tire is formed by vulcanization molding using the vulcanization molding apparatus, after vulcanization molding, the outer profile shape of the pneumatic tire 10 becomes symmetrical with respect to tire equator E. On the other hand, since the center plane of the bladder is offset with respect to the center plane of the die, after vulcanization molding, a tire thickness of the pneumatic tire 10 becomes asymmetrical with respect to tire equator E such that the tire thickness becomes thin at a portion of the pneumatic tire 10 on a side where the center plane of the bladder is offset from the center plane of the die, and the tire thickness becomes thick at a portion of the pneumatic tire 10 on a side opposite to the portion of the pneumatic tire 10 offset from the center plane of the die.

(4) Manner of Operation and Advantageous Effects of Pneumatic Tire of Embodiment 1

In the pneumatic tire 10 of the embodiment 1, since a tire thickness is set in left and right asymmetry, a lateral force is generated. Accordingly, a magnitude of the lateral force can be adjusted even when an outer profile shape which is originally formed in left and right symmetry is not changed. Further, when the outer profile shape of the pneumatic tire 10 is in left and right symmetry and a design of the tread portion is also in left and right symmetry, a magnitude of a lateral force can be adjusted without destroying the feature of the design where the outer profile shape of the pneumatic tire 10 and the design of the tread portion are in left and right symmetry.

In the pneumatic tire 10 where the tire thickness is set in left and right asymmetry, out of left and right portions of the pneumatic tire 10, the portion having a larger tire thickness has a larger weight and such a portion minimally collapses when the pneumatic tire 10 is brought into contact with the ground. Accordingly, a lateral force attributed to a tire thickness which is set in left and right asymmetry is generated toward a side where the tire thickness is small from a side where the tire thickness is large.

In view of the above, for example, in a case where a combined lateral force produced by combining a ply steer and a pattern steer to each other is generated in the pneumatic tire 10, a tire thickness is increased on a side of the direction that the combined lateral force is directed, and the tire thickness is decreased on a side opposite to the side of the direction that the combined lateral force is directed. With such a configuration, a combined lateral force produced by combining a ply steer and a pattern steer to each other can be canceled out by a lateral force produced by setting the tire thickness in left and right asymmetry. Accordingly, a lateral force of the pneumatic tire 10 can be eliminated or can be reduced.

Further, in a case where a combined lateral force produced by combining a ply steer and a pattern steer to each other is rarely generated in the pneumatic tire 10, for example, a tire thickness is increased on either the left side or the right side of the pneumatic tire 10, and a tire thickness is decreased on the opposite side. With such a configuration, a lateral force can be generated in the pneumatic tire 10.

In this embodiment, within a range sandwiched by the ground contact edges 35 on both sides in the tire width direction, when a difference between tire thicknesses at the left and right sides of the pneumatic tire 10 is larger on a ground contact edge 35 side than on a tire equator E side, a lateral force produced by setting a tire thickness in left and right asymmetry can be increased.

In the above-mentioned first to third thickness configurations, when a difference between tire thicknesses at the left and right sides which becomes maximum is 2% or more of a maximum thickness of the tire radial outside portion 50, a sufficiently large lateral force produced by setting the tire thickness in left and right asymmetry is generated. When a difference between tire thicknesses at the left and right sides which becomes maximum is 7% or less of the maximum thickness, there is no possibility that durability of the pneumatic tire is lowered due to an excessively large difference between tire thicknesses at the left and right sides.

(5) Modification of Embodiment 1

Various modifications of the embodiment 1 are conceivable without departing from the gist of the invention. For example, by combining the technical features of the pneumatic tire 10 of the embodiment 1 and technical features of a pneumatic tire 110 of an embodiment 2 described later with each other, it is possible to provide a pneumatic tire where an outer profile shape of the pneumatic tire is formed in left and right symmetry, a tire thickness is set in left and right asymmetry, and out of belts which cover a width equal to or more than a half of a ground contact width, the belt disposed on an outermost layer is offset with respect to the tire equator E.

2. Embodiment 2

(1) Basic Structure of Pneumatic Tire 110

The basic structure of the pneumatic tire 110 of the embodiment 2 is equal to the basic structure of the pneumatic tire 10 of the embodiment 1. In FIG. 3 which shows the pneumatic tire 110 of the embodiment 2, parts identical to corresponding parts of the pneumatic tire 10 of the embodiment 1 are given the same symbols used in FIG. 1.

(2) Arrangement of Belt

As shown in FIG. 3, in the embodiment 2, a second belt 24 which is a belt disposed on an outermost layer (referred to as "outermost belt") out of belts which cover a width equal to or more than a half of a ground contact width is offset with respect to a tire equator E. A state where the belt is offset with respect to the tire equator E means that a center position C of the belt in the width direction is offset in either the leftward direction or the rightward direction from the tire equator E.

An offset amount L of the second belt 24 which forms the outermost belt, that is, a length from the tire equator E to the center position C of the second belt 24 in the width direction differs for each tire depending on whether or not a lateral force is to be generated in the pneumatic tire 110, a magnitude of a lateral force to be generated in the pneumatic tire 110 or the like. A preferable range of the offset amount L is 2% or more and 7% or less of a belt width M of the second belt 24.

(3) Method for Manufacturing Pneumatic Tire 110

The pneumatic tire 110 having the above-mentioned structure can be manufactured as follows. For example, in the course of manufacturing an unvulcanized tire, at the time of adhering belts to the carcass 13 or the like, the second belt 24 which forms the outermost belt is adhered in an offset manner with respect to the tire equator E.

(4) Manner of Operation and Advantageous Effects in Embodiment 2

In the pneumatic tire 110 of the embodiment 2, a lateral force is generated by offsetting the second belt 24 which forms the outermost belt with respect to the tire equator E. Accordingly, a magnitude of the lateral force can be adjusted even when a structure of a tread portion is not changed.

In the pneumatic tire 110 where the second belt 24 which forms the outermost belt is offset, out of left and right portions of the pneumatic tire 110, a portion toward which the second belt 24 is offset has a larger weight and the portion minimally collapses when the pneumatic tire 110 is brought into contact with the ground. Accordingly, a lateral force produced by offsetting the second belt 24 is generated in a direction opposite to the direction that the second belt 24 is offset.

In view of the above, for example, the second belt 24 is offset in a direction that a lateral force is directed when assuming that the second belt 24 is not offset. With such a configuration, a lateral force generated when the second belt 24 is not offset can be canceled out by a lateral force produced by offsetting the second belt 24 and hence, a lateral force of the pneumatic tire can be eliminated or can be reduced.

A more specific case is exemplified. An upward direction is defined as a tire advancing direction. A rightward downward direction is assumed as an inclination direction of cords 25 in the second belt 24 which forms the outermost belt on a ground contact surface side, and a rightward upward direction is assumed as an inclination direction of cords 25 in the second belt 24 on a non-ground contact surface side which is a side opposite to the ground contact surface side. In such a case, a lateral force toward the rightward direction is generated attributed to the inclination direction of the cords 25 in the second belt 24. In view of the above, the second belt 24 is offset in the rightward direction. With such a configuration, a lateral force attributed to the inclination direction of the cords 25 in the second belt 24 can be canceled out by a lateral force generated by offsetting the second belt 24.

Further, for example, in the case where a lateral force is rarely generated in the pneumatic tire 110 when assuming that the second belt 24 is not offset, the second belt 24 is offset. With such a configuration, a lateral force can be generated in the pneumatic tire 110.

In this embodiment, when an offset amount L is 2% or more of the belt width M of the second belt 24, a sufficiently large lateral force is generated by offsetting the second belt 24. When the offset amount L is 7% or less of the belt width M of the second belt 24, there is no possibility that durability of the pneumatic tire is lowered due to an excessively large offset amount L.

(5) Modification of Embodiment 2

Various modifications of the embodiment 2 are conceivable without departing from the gist of the invention.

First, in the above-mentioned embodiment 2, only the second belt 24 which forms the outermost belt is offset with respect to the tire equator E. However, other belts may be offset in the same manner. For example, when two belts consisting of the first belt 22 and the second belt 24 are stacked as in the case shown in FIG. 3, not only the second belt 24 but also the first belt 22 may be offset.

Further, as described also in the modification of the embodiment 1, the pneumatic tire may be configured such that the technical features of the pneumatic tire 10 of the embodiment 1 and the technical features of the pneumatic tire 110 of the embodiment 2 are combined with each other. That is, the pneumatic tire may be configured such that the outer profile shape is formed in left and right symmetry, the tire thickness is set in left and right asymmetry, and the belt disposed on the outermost layer out of the belts which cover a width equal to or more than a half of a ground contact width is offset with respect to the tire equator E.

In this case, by adjusting a difference between tire thicknesses or the like of the pneumatic tire at the left and right sides and an offset amount or the like of the belt, a magnitude of a lateral force generated in the pneumatic tire can be adjusted. For example, assume a case where a combined lateral force produced by combining a ply steer and a pattern steer to each other is extremely large so that the combined lateral force cannot be canceled out by merely forming a difference between tire thicknesses of the pneumatic tire at the left and right sides. In such a case, by further performing an operation of offsetting the belt, the combined lateral force can be canceled out.

3. Comparison Example and Example

A test was carried out in which a pneumatic tire of a comparison example and pneumatic tires of examples shown in Table 1 are evaluated with respect to a magnitude of a lateral force generated in each pneumatic tire. The pneumatic tire of the comparison example 1 is a tire where a tire thickness is set in left and right symmetry, and a tire equator and a center position of a belt in the width direction agree with each other. In the pneumatic tire of the comparison example 1, a combined lateral force produced by combining a ply steer and a pattern steer to each other is generated. The pneumatic tires of the examples 1 to 4 are tires prepared such that a structure of the pneumatic tire of the comparison example 1 is adopted as a basic structure, and modifications are applied to the pneumatic tire of the comparison example 1. The pneumatic tires of the examples 1, 4 are pneumatic tires where a tire thickness is set in left and right asymmetry so as to generate a lateral force in a direction that the lateral force can cancel out a lateral force generated in the pneumatic tire of the comparison example 1. The pneumatic tires of the examples 1, 4 have the first thickness configuration and the second thickness configuration in the embodiment 1. The pneumatic tires of the examples 2 to 4 are pneumatic tires where an outermost belt is offset so as to generate a lateral force in a direction that the lateral force can cancel out a lateral force generated in the pneumatic tire of the comparison example 1.

"difference between tire thicknesses at the left and right sides" and "maximum thickness" in Table 1 have the meanings defined in the embodiment 1, and "offset amount of a belt" has the meaning defined in the embodiment 2.

In evaluating each pneumatic tire, a tire size is set to 155/65R14, a wheel rim size is set to 14×4.5JJ, an internal pressure is set to 230 kPa, and a load is set to 2.66 kN. Each pneumatic tire having the above-mentioned size is placed on a belt of a flat belt tester, the internal pressure and the load are set as described above, and the belt is rotated at a speed of 30 km per hour. A load in the lateral direction with respect to the tire advancing direction which is applied to a rotary shaft with a self aligning torque set to 0N·m is calculated.

A result of the test is shown in Table 1. It is understood from Table 1 that a lateral force generated in the pneumatic tires of the examples 1 to 4 is smaller than a lateral force generated in the pneumatic tire of the comparison example 1. From such a result, it is confirmed that, by setting a tire thickness in left and right asymmetry or by offsetting the belt with respect to the tire equator, a lateral force generated when the tire thickness is not set in left and right asymmetry or the belt is not offset with respect to the tire equator can be canceled out.

TABLE 1

|  | Comparison Example 1 | Example 1 | Example 2 | Example 3 | Example 4 |
|---|---|---|---|---|---|
| Difference between tire thicknesses at left and right sides | 0% | 5.0% of maximum thickness | 0% | 0% | 5.0% of maximum thickness |
| Offset amount of belt | 0% | 0% | 1.5% of belt width | 5.0% of belt width | 5.0% of belt width |
| Magnitude of lateral force | 100N | 80N | 98N | 85N | 70N |

What is claimed is:

1. A pneumatic tire configured such that:
   an outer profile shape of the pneumatic tire is symmetrically formed in left and right portions of the tire with respect to a tire equator, and
   a thickness of the pneumatic tire from an outer surface of the tire to an inner surface of the tire is asymmetrically formed in positions on the left and right portions of the tire equally distant with respect to the tire equator,
   wherein the thickness is a dimension from a ground contact surface of the tire to the inner surface of the tire in a direction normal to the ground contact surface, and
   wherein the thickness of the pneumatic tire from the ground contact surface to the inner surface is large on a side toward which a combined lateral force produced by combining a lateral force attributed to a tire internal structure and a lateral force attributed to a design of a tread portion to each other is directed, and the thickness of the pneumatic tire from the ground contact surface to the inner surface is small on a side opposite to the side toward which the combined lateral force is directed.

2. The pneumatic tire according to claim 1, wherein a design of the tread portion is symmetrically formed in the left and right portions of the tire with respect to the tire equator.

3. The pneumatic tire according to claim 1, wherein within a range between ground contact edges on left and right sides in a tire width direction, a difference between tire thicknesses of the pneumatic tire at the left and right sides is larger at a ground contact edge side than at a tire equator side.

4. The pneumatic tire according to claim 3, wherein a maximum value of the difference between tire thicknesses at the left and right portions away from the tire equator by an equal distance is set to 2% or more and 7% or less of the maximum thickness of the tire on a tire radial outside portion.

5. The pneumatic tire according to claim 1, wherein a difference between tire thicknesses at left and right portions away from the tire equator by an equal distance is maximum when either the left or the right is at a maximum thickness position of the tire on a tire radial outside portion and the other of the two left and right portions is at a position which is in left and right symmetry with the maximum thickness position with respect to the tire equator on the tire radial outside portion.

6. The pneumatic tire according to claim 5, wherein a maximum value of the difference between tire thicknesses at the left and right portions away from the tire equator by the equal distance is set to 2% or more and 7% or less of the maximum thickness of the tire on the tire radial outside portion.

7. The pneumatic tire according to claim 1, wherein the pneumatic tire includes at least one belt, and an outermost layer of the at least one belt which covers a width more than a half of and less than or equal to a ground contact width, and is offset with respect to the tire equator.

8. The pneumatic tire according to claim 7, wherein an offset amount of the outermost layer of the at least one belt is set to 2% or more and 7% or less of a width of the outermost layer of the at least one belt.

* * * * *